(12) United States Patent
Kotecha et al.

(10) Patent No.: US 10,863,383 B2
(45) Date of Patent: *Dec. 8, 2020

(54) TAGGING AND METERING NETWORK TRAFFIC ORIGINATING FROM TETHERED STATIONS

(71) Applicant: Verizon Patent and Licensing Inc., Arlington, VA (US)

(72) Inventors: Lalit R. Kotecha, San Ramon, CA (US); Rakesh Chandwani, Morganville, NJ (US)

(73) Assignee: Verizon Patent and Licensing Inc., Basking Ridge, NJ (US)

( * ) Notice: Subject to any disclaimer, the term of this patent is extended or adjusted under 35 U.S.C. 154(b) by 0 days.

This patent is subject to a terminal disclaimer.

(21) Appl. No.: 16/529,961

(22) Filed: Aug. 2, 2019

(65) Prior Publication Data

US 2020/0008101 A1    Jan. 2, 2020

Related U.S. Application Data

(63) Continuation of application No. 16/023,143, filed on Jun. 29, 2018, now Pat. No. 10,412,633.

(51) Int. Cl.
| | | |
|---|---|---|
| *H04W 4/00* | (2018.01) | |
| *H04W 28/10* | (2009.01) | |
| *H04L 12/26* | (2006.01) | |
| *H04W 28/20* | (2009.01) | |
| *H04L 12/801* | (2013.01) | |
| *H04W 72/12* | (2009.01) | |

(52) U.S. Cl.
CPC ......... *H04W 28/10* (2013.01); *H04L 43/0888* (2013.01); *H04L 43/0894* (2013.01); *H04L 43/16* (2013.01); *H04L 47/14* (2013.01); *H04L 47/29* (2013.01); *H04W 28/20* (2013.01); *H04W 72/1257* (2013.01)

(58) Field of Classification Search
None
See application file for complete search history.

(56) References Cited

U.S. PATENT DOCUMENTS

| | | |
|---|---|---|
| 8,949,439 B1 | 2/2015 | Sahuguet |
| 9,380,462 B1 | 6/2016 | Vivanco |
| 2009/0067372 A1* | 3/2009 | Shah ............... H04L 67/322 370/328 |

(Continued)

*Primary Examiner* — Zewdu A Beyen

(57) ABSTRACT

Systems and methods receive first traffic originating from a mobile device and second traffic originating from second devices tethered to the mobile device; tag the first traffic to indicate that the traffic originates from the mobile device; tag the second traffic to indicate that the traffic originates from the second devices; receive subscriber data that includes a first threshold and a second threshold, wherein the first threshold is associated with the first traffic originating from the mobile device and the second threshold is associated with the second traffic originating from the second devices tethered to the mobile device; determine that an amount of the second traffic exceeds the second threshold; rate limit the second traffic without rate limiting the first traffic when the amount of the second traffic exceeds the second threshold and an amount of the first traffic does not exceed the first threshold.

20 Claims, 5 Drawing Sheets

(56) References Cited

U.S. PATENT DOCUMENTS

| | | | |
|---|---|---|---|
| 2013/0171964 A1* | 7/2013 | Bhatia | H04W 12/08 455/411 |
| 2014/0086050 A1* | 3/2014 | Swann | H04L 47/25 370/235 |
| 2014/0126391 A1* | 5/2014 | Liu | H04W 52/0216 370/252 |
| 2014/0317278 A1* | 10/2014 | Kersch | H04L 67/22 709/224 |
| 2015/0351004 A1* | 12/2015 | Ko | H04W 12/003 455/411 |
| 2015/0358851 A1* | 12/2015 | Toda | H04W 52/0251 370/311 |
| 2019/0082348 A1* | 3/2019 | Kim | H04L 12/14 |

* cited by examiner

TAGGING AND METERING NETWORK TRAFFIC ORIGINATING FROM TETHERED STATIONS

CROSS-REFERENCE TO RELATED APPLICATION

This application is a continuation of U.S. patent application Ser. No. 16/023,143 filed on Jun. 29, 2018, the disclosure of which is hereby incorporated by reference.

BACKGROUND

In a wide area wireless network (such as a Long Term Evolution (LTE) network or a Fifth Generation (5G) network), a data session may originate from a mobile device that is registered on the network or from a device that is tethered to the mobile device. For example, the mobile device may run a radio frequency based hotspot and other devices may tether to the mobile device to create a data session with any server in a content network.

DETAILED DESCRIPTION OF PREFERRED EMBODIMENTS

The following detailed description refers to the accompanying drawings. The same reference numbers in different drawings may identify the same or similar elements.

Tethered devices can consume large amounts of data. Given the unlimited data plans that many subscribers purchase, a few subscribers of a data network that consume data using tethered devices may put other subscribers at a significant disadvantage, particularly in network locations that are congested due to a large number of network users being present in a small geographical space. Current solutions exist that allow network providers to throttle users' data usage based on usage thresholds on overall data. However, these thresholds do not differentiate between traffic originating from mobile devices and traffic originating from tethered devices connected to the mobile devices. Instead, these thresholds are based on total data consumption, regardless of from where the traffic originates. This puts subscribers at a disadvantage since, in some situations, a user may not be aware of traffic that is originating from a tethered device. Therefore, a user may experience a lower quality of service (QoS) for traffic originating from a mobile device due to unknown traffic originating from tethered devices used by the user or other users.

Implementations described herein relate to methods, devices, and systems for managing tethered traffic based on thresholds set for the tethered traffic. Traffic received from a mobile device may be tagged based on whether the traffic originates from the mobile device or from a tethered device connected to the mobile device. Based on usage thresholds associated with a user of the mobile device, traffic originating from the tethered devices may be throttled when an amount of the traffic originating from the tethered devices exceeds a threshold. In this way, traffic originating from the mobile device may experience a high QoS even when traffic originating from the tethered device is rate limited.

As used herein, the terms "user," "owner," "consumer," "subscriber," and/or "customer" are intended to be used interchangeably. As also used herein, the term "tethered" should be construed as any type of network connection included wired and/or wireless.

Figure 1:
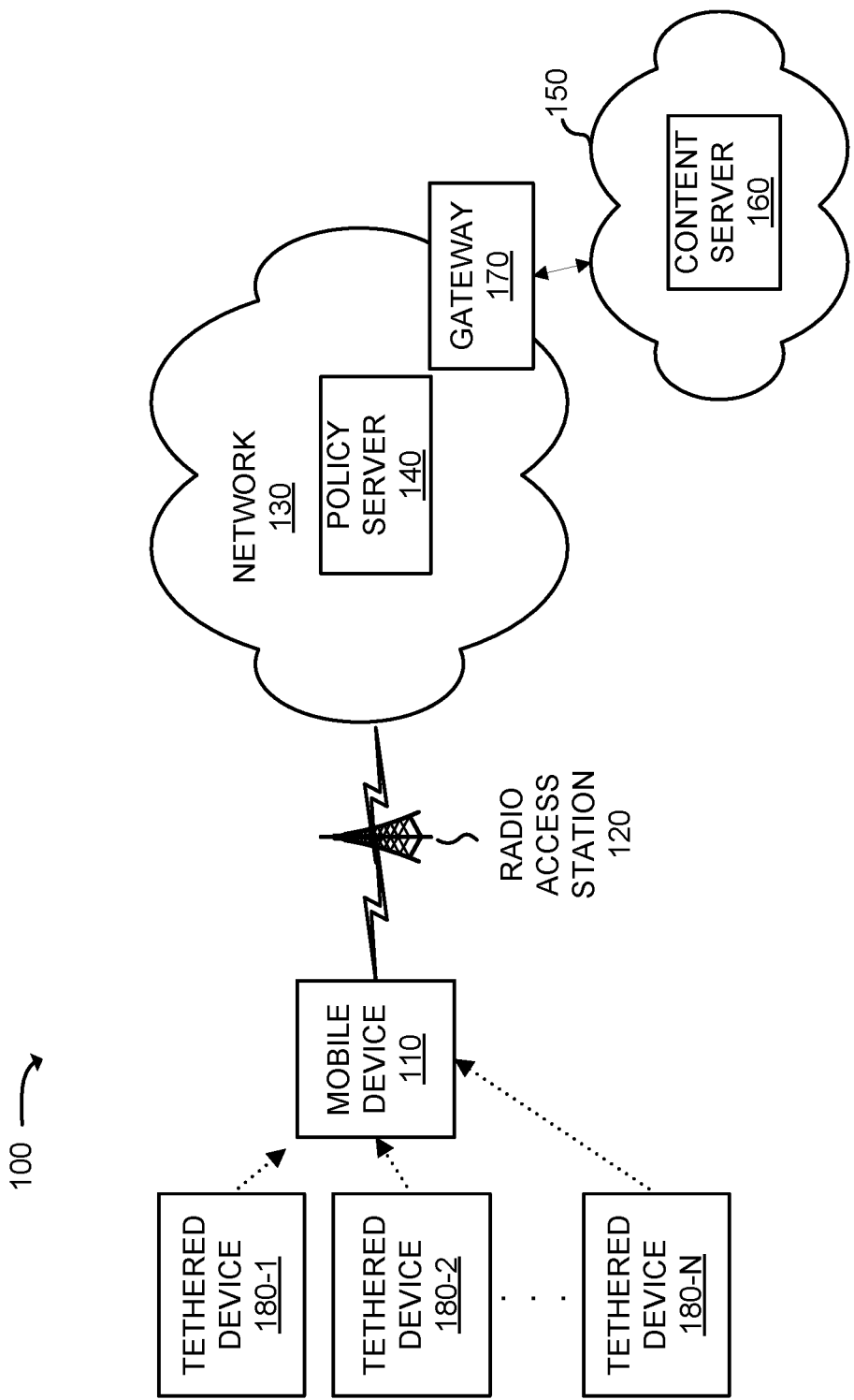
FIG. 1 is a diagram illustrating an exemplary environment in which systems and/or methods, described herein, may be implemented.

FIG. 1 is a diagram illustrating an exemplary environment 100 in which systems and/or methods, described herein, may be implemented. As shown in FIG. 1, example environment 100 may include a mobile device 110, a radio access station 120, a network 130, a policy server 140, a packet network 150, a content server 160, a gateway 170, and tethered devices 180-1 to 180-N (wherein N may be equal to any integer greater than or equal to 1, referred to herein individually as tethered device 180 or 180-x and collectively as tethered devices 180). In one implementation, policy server 140 is used to manage traffic originating from mobile device 110 and tethered devices 180. A single mobile device 110, radio access station 120, network 130, policy server 140, packet network 150, content server 160, and gateway 170 have been illustrated in FIG. 1 for simplicity. In practice, there may be additional mobile devices 110, radio access stations 120, networks 130, policy servers 140, packet networks 150, content servers 160, and gateways 170.

Mobile device 110 may include any device capable of communicating via a network. For example, mobile device 110 may correspond to a mobile communication device (e.g., a mobile phone, a smart phone, a personal digital assistant (PDA), or a wireline telephone), a computer device (e.g., a laptop computer, a tablet computer, or a personal computer, a notebook, a netbook, a wearable computer (e.g., a wrist watch, eye glasses, etc.)), a gaming device, a music playing device, a home appliance device, a home monitoring device, a set top box, or another type of communication or computation device.

Radio access station 120 may include one or more computation and/or communication devices that receive voice and/or data and transmit that voice and/or data to mobile device 110 using radio communications. Radio access station 120 may also receive voice and/or data transmitted from mobile device 110 and/or tethered device 180. In one implementation, radio access station 120 may utilize LTE standards operating in, for example, a 600 megahertz (MHz) frequency band, 700 MHz frequency band, a 1900 MHz frequency band, or other frequency bands. In the context of an LTE network, radio access station 120 may also be referred to as an eNodeB or eNB. In another implementation, radio access station 120 may utilize 5G standards operating in, for example, a 28 gigahertz (GHz) frequency band, a 33 GHz frequency band, or other frequency band. In the context of a 5G network, radio access station 120 may also be referred to as a gNodeB or gNB. Radio access station 120 may provide an interface for connection to network 130.

Network 130 may include one or more wired, wireless, or optical networks that provide connectivity to radio access station 120. Network 130 may include a local area network (LAN), a wide area network (WAN), a public switched telephone network (PSTN), a metropolitan area network (MAN), other types of networks, or a combination of networks. In one implementation, network 130 may be an LTE network or a 5G network, or a combination of each. In another implementation, other networks, such as a network that provides a wireless (radio) interface to mobile devices 110 using the 3rd generation (3G) mobile telecommunications standards, other 4th generation (4G) or 5th generation (5G) mobile telecommunications standards different from an LTE network, or future networks may be used. 4G networks can include, in addition to or as alternative to an LTE network, other radio access networks, such as an enhanced high rate packet data (eHRPD) network, and/or a wireless core network (e.g., referred to as an evolved packet core (EPC) network). Network 130, when implemented as an LTE network, may include an evolved packet core (EPC) network as an all-internet protocol (IP) packet-switched core network that supports high-speed wireless and wireline broadband access technologies.

Policy server 140 may be a computing device or server that may access subscriber databases and other resources to make policy decisions relating to subscribers (e.g., users of mobile device 110). The policy decisions may relate to, for example, QoS decisions and charging rules. In one implementation, policy server 140 may be used to raise or lower bandwidths (e.g., maximum bit rate or average maximum bit rate) of traffic associated with subscribers' mobile devices or traffic associated with devices tethered to subscribers' mobile devices (tethered devices), charge subscribers based on their volume of network data usage, charge subscribers for QoS guarantees, and/or limit application usage for certain events (e.g., time of day, load conditions, etc.). In an LTE network, policy server 140 may be implemented, for example, as a Policy Control and Rules Function (PCRF) server. In a 5G network, policy server 140 may be implemented, for example, as a Policy Control Function (PCF) server.

Policy server 140 may include logic to adjust bit rates or deny service based on a number of factors, such as time of day, subscriber information, policy information, etc. For example, during particular times of the day, policy server 140 may determine to not lower bit rates (e.g., throttle bit rates) even when a threshold for tethered traffic has been reached. As another example, policy server 140 may deny service to an additional tethered device 180 if a maximum number of tethered devices are already connected to mobile device 110.

Packet network 150 may include, for example, a public packet-based network, such as the Internet. In other implementations, packet network 150 may include any combination of wired, wireless, or optical network.

One or more servers, such as content server 160, may be connected to or located within packet network 150. Content server 160 may include devices that provide content to mobile device 110. The provided content may include, for example, movies, television shows, or other multimedia content, that is delivered to mobile device 110 in response to a request from mobile device 110. The video may be delivered, for instance, as IP unicast traffic. Although content server 160 is shown as part of packet network 150, in an alternative implementation, content server 160 may be part of another network, such as network 130 and/or an LTE network.

Gateway 170 may include one or more devices that may be connected to packet network 150 and connected to or located within network 130. Gateway 170 may provide connectivity to external networks, such as packet network 150. Mobile device 110 may have simultaneous connectivity with more than one gateway 170 to multiple additional networks. Gateway 170 may perform, for example, policy enforcement, packet filtering for each subscriber, charging support, lawful interception, and/or packet screening. In an LTE network, gateway 170 may be implemented, for example, as part of a Packet Data Network Gateway (PGW). In a 5G network, gateway 170 may implemented, for example, as part of a User Plane Function (UPF) or a Session Management Function (SMF).

Tethered devices 180-1 through 180-N may include any devices capable of tethering to mobile device 110 to access content server 160 via network 130 and packet network 150. For example, tethered device 180 may correspond to a mobile communication device (e.g., a mobile phone, a smart phone, a personal digital assistant (PDA), or a wireline telephone), a computer device (e.g., a laptop computer, a tablet computer, a personal computer, a notebook, a netbook, a wearable computer, etc.), a gaming device, a music playing device, a home appliance device (e.g., a connected appliance, such as a refrigerator), a home monitoring device, such as a camera or security sensor/panel, an Internet of Things (IoT) device, a set top box, a smart television, or another type of communication or computation device. Tethered device 180 may connect to mobile device 110 via a radio frequency based hotspot that is run on the mobile device.

While implementations herein are described primarily in the context of broadband services via LTE or 5G, other wireless protocols may be used. For example, components conforming to LTE or 5G standards described herein may be replaced by components conforming to other network protocols (e.g., Global System for Mobile Communications (GSM), wideband code division multiple access (WCDMA), Ultra Mobile Broadband (UMB), Universal Mobile Telecommunications System (UMTS), Code Division Multiple Access 2000 (CDMA2000), High-Speed Packet Access (HSPA), Worldwide Interoperability for Microwave Access (WiMax), etc.).

Although FIG. 1 illustrates components in a portion of environment 100, in other implementations, the portion of environment 100 may include additional components, fewer components, different components, or differently arranged components than those illustrated in FIG. 1, and described herein. Alternatively, or additionally, one or more components of the portion of environment 100 may perform one or more tasks described as being performed by one or more other components of the portion of environment 100.

Figure 2:
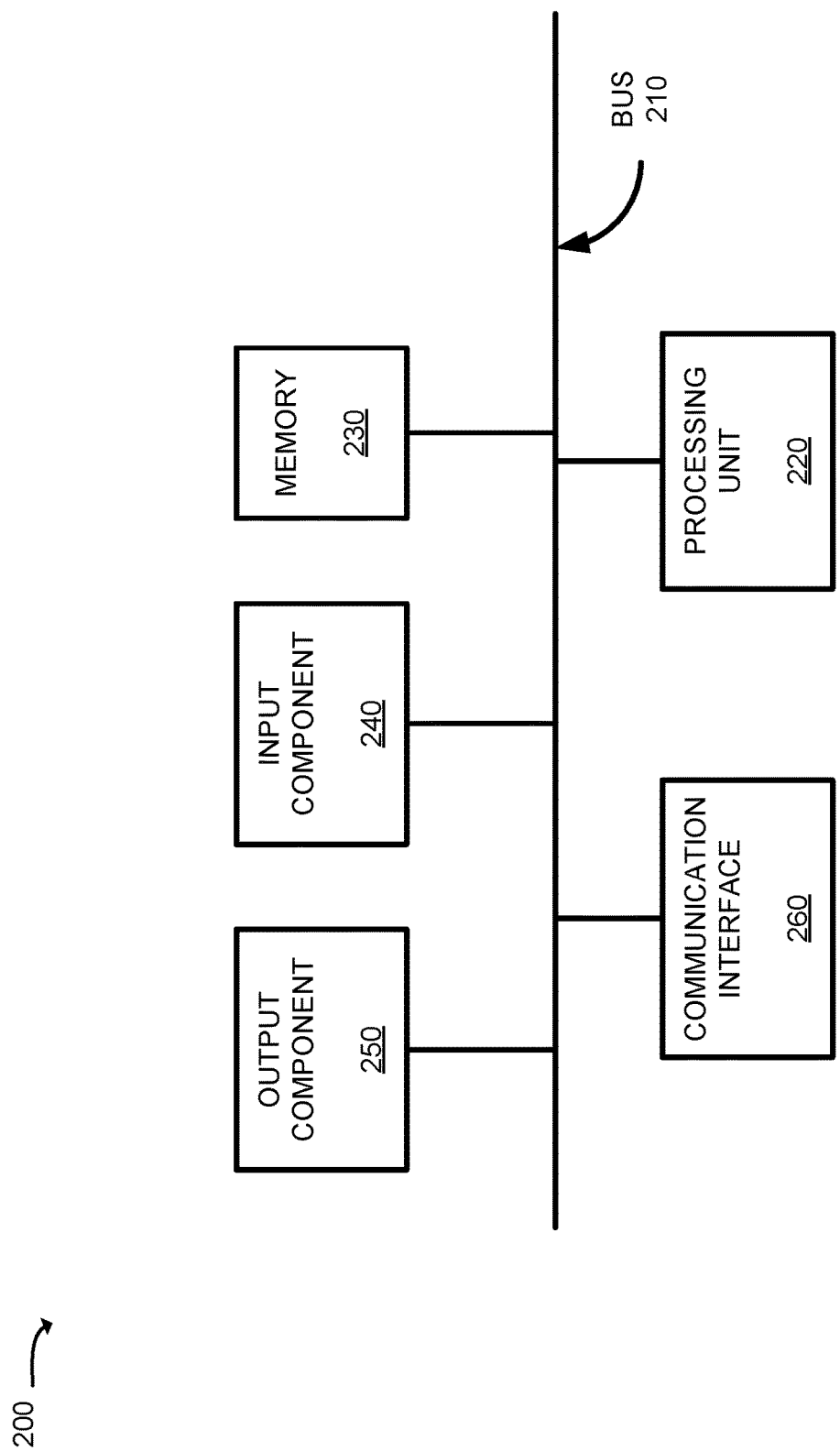
FIG. 2 is a diagram of exemplary components of one or more of the devices of FIG. 1.

FIG. 2 is a diagram of example components of a device 200 that may correspond to one of the components of mobile device 110, tethered device 180, radio access station 120, network 130, or packet network 150 (e.g., content server 160, gateway 170, policy server 140, etc.). As illustrated, device 200 may include a bus 210, a processing unit 220, a memory 230, an input component 240, an output component 250, and a communication interface 260.

Bus 210 may permit communication among the components of device 200. Processing unit 220 may include one or more processors or microprocessors that interpret and execute instructions. Additionally or alternatively, processing unit 220 may be implemented as or include one or more application specific integrated circuits (ASICs), field programmable gate arrays (FPGAs), or the like.

Memory 230 may include a random access memory (RAM) or another type of dynamic storage device that stores information and instructions for execution by processing unit 220, a read only memory (ROM) or another type of static storage device that stores static information and instructions for the processing unit 220, and/or some other type of magnetic or optical recording medium and its corresponding drive for storing information and/or instructions.

Input component 240 may include a device that permits an operator to input information to device 200, such as a button, a switch, a keyboard, a keypad, a mouse, or the like. Output component 250 may include a device that outputs information to the operator, such as a display (e.g., a liquid crystal display), a printer, a speaker, a light emitting diode (LED), etc.

Communication interface 260 may include one or more transceivers that enables device 200 to communicate with other devices and/or systems. For example, communication interface 260 may include one or more radio frequency (RF) receivers, transmitters, and/or transceivers and or more antennas for transmitting and receiving data. Communication interface 260 may also include a modem or Ethernet interface to a LAN or other mechanism for communicating with other devices.

As described herein, device 200 may perform certain operations in response to processing unit 220 executing software instructions contained in a computer-readable medium, such as memory 230. A computer-readable medium may be defined as a non-transitory memory device. A memory device may include space within a single physical memory device or spread across multiple physical memory devices. The software instructions may be read into memory 230 from another computer-readable medium or from another device via communication interface 260. The software instructions contained in memory 230 may cause processing unit 220 to perform processes described herein. Alternatively, hardwired circuitry may be used in place of or in combination with software instructions to implement processes described herein. Thus, implementations described herein are not limited to any specific combination of hardware circuitry and software.

Although FIG. 2 shows exemplary components of device 200, in other implementations, device 200 may contain fewer components, different components, differently arranged components, or additional components than depicted in FIG. 2. Alternatively, or additionally, one or more components of device 200 may perform one or more tasks described as being performed by one or more other components of device 200.

Figure 3:
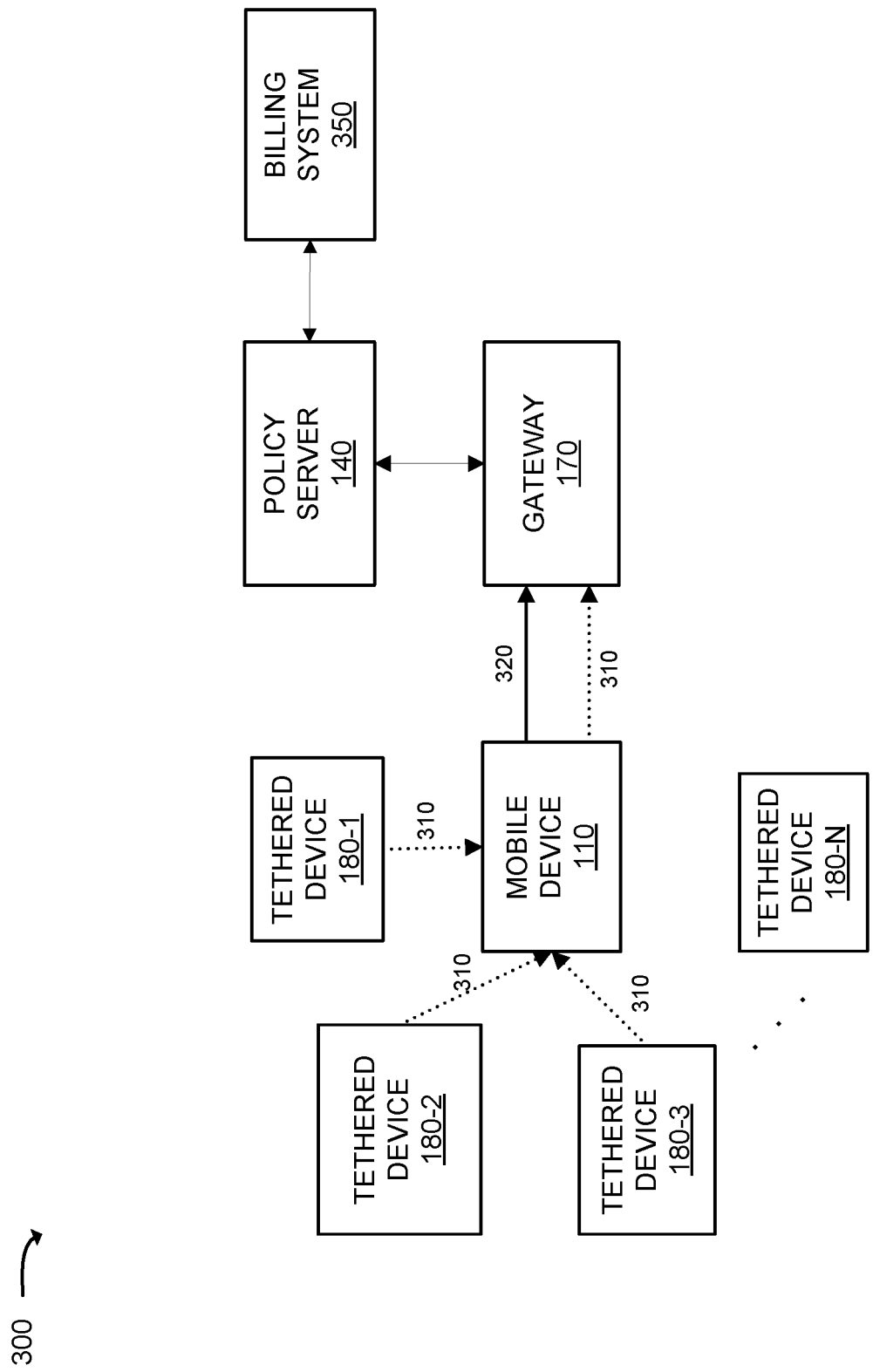
FIG. 3 is a diagram illustrating exemplary communication paths between components of FIG. 1 according to an implementation described herein.

FIG. 3 is a diagram illustrating exemplary communication paths between components of FIG. 1 according to an implementation described herein. As illustrated in FIG. 3, tethered devices 180-1 to 180-N may connect to mobile device 110 via a hotspot in order to create a data session with a server device, such as content server 160 (not shown). For example, tethered devices 180-1 to 180-N may connect to mobile device 110 via a wireless local area network (WLAN), using a Bluetooth connection, by a physical connection using a cable, or other wireless or wired mechanisms. Mobile device 110 may receive tethered traffic 310, such as requests for content, from tethered devices 180 and transmit the tethered traffic 310 toward, for example, content server 160. Mobile device 110 may further receive content from content server 160 and deliver the content to tethered devices 180 as tethered traffic 310. In addition, mobile device 110 may create a separate data session with a server device, such as content server 160, by sending mobile device traffic 320 toward content server 160 and receiving mobile device traffic 320 from content server 160.

Gateway 170 may receive tethered traffic 310 and mobile device traffic 320 and may use pattern recognition techniques to determine from where the traffic originated. For example, gateway 170 may perform packet inspection by inspecting an Internet Protocol (IP) header associated with the traffic to determine a source address associated with the traffic. Based on the source address, gateway 170 may determine whether the traffic is tethered traffic 310 or mobile device traffic 320. Gateway 170 may tag the traffic based on whether the traffic is tethered traffic 310 or mobile device traffic 320.

Gateway 170 may monitor an amount of tethered traffic 310 and mobile device traffic 320 that it receives. For example, gateway 170 may count the number of bytes of tethered traffic 310 and mobile device traffic 320 received. Gateway 170 may report the amount of tethered traffic 310 and mobile device traffic 320 to policy server 140 and billing system 350.

Policy server 140 may receive subscriber information and policies for a given subscriber and may apply the policies to tethered traffic 310 and mobile device traffic 320 based on the subscriber information. For example, the subscriber information may indicate that the subscriber associated with mobile device 110 has subscribed to a subscription plan that allows 5 gigabytes (GB) of tethered traffic 310 and 20 GB of mobile device traffic 320 in a given billing cycle (e.g., one month). The policy may indicate that tethered traffic 310 is to be throttled after the subscriber has used 5 GB of tethered traffic 310 in the billing cycle and mobile device traffic 320 is to be throttled after the subscriber has used 20 GB of mobile device traffic 320 in the billing cycle. Policy server 140 may receive an indication from gateway 170 that tethered traffic 310 has exceeded 5 GB and mobile device traffic 320 has not exceeded 20 GB. Policy server 140 may then instruct gateway 170 to lower the bit rate on subsequent tethered traffic 310, while not lowering the bit rate on mobile device traffic 320.

In another implementation, the subscriber information may indicate that only a particular number of tethered devices 180 may connect to mobile device 110 at the same time. For example, the subscriber information may indicate that two tethered devices 180 may be connected to mobile device 110 at any given time. The policy information may indicate that any additional tethered devices 180 that are attempting to connect to mobile device 110 are to be denied service. Policy server 140 may receive an indication from gateway 170 that tethered devices 180-1 and 180-2 are connected to mobile device 110 and that tethered device 180-3 is attempting to connect to mobile device 110. In response, policy server 140 may instruct gateway 170 to deny service to tethered device 180-3 by dropping packets received from tethered device 180-3.

Billing system 350 may include a computing device that stores subscriber information for subscribers to a service. For example, a subscriber associated with mobile device 110 may subscribe to a subscription plan that allows a particular bit rate for tethered traffic 310 and mobile device traffic 320 until a threshold number of bytes have been consumed in a billing cycle. The threshold number of bytes for tethered traffic 310 may be different than the threshold number of bytes for mobile device traffic 320. In addition, the particular bit rate for tethered traffic 310 may be different than the particular bit rate for mobile device traffic 320.

In another implementation, the subscriber associated with mobile device 110 may modify how much data can be divided between mobile device 110 and tethered devices 180. For example, a subscriber may subscribe to a subscription plan that allows 25 GB of data to be used in a billing cycle without lowering a bit rate associated with mobile device 110 or tethered devices 180. In this case, the subscriber may customize the subscriber plan to divide the data between mobile device 110 and tethered devices. For example, the subscriber may indicate that mobile device 110 is allowed 20 GB of data per billing cycle and tethered devices 180 are allowed 5 GB of data per billing cycle without experiencing a lowered bit rate.

In another implementation, the subscriber information may store a priority for tethered devices 180. For example, a subscriber associated with mobile device 110 may indicate that particular tethered devices 180 may be allowed to use more data than other tethered devices 180. In addition, a subscription plan associated with a subscriber may be automatically adjusted based on the usage profile and history associated with the subscriber.

The subscriber information may additionally indicate a policy to apply to tethered traffic 310 and/or mobile device traffic 320 after the subscriber has consumed the threshold number of bytes in the billing cycle. For example, the policy associated with the subscriber may indicate that tethered traffic 310 should be throttled after the subscriber has used a first threshold number of bytes of tethered traffic 310 and that mobile device traffic 320 should be throttled after the subscriber has used a second threshold number of bytes of mobile device traffic 320. In addition, the policy may indicate that the user can purchase additional bytes of tethered traffic 310 and/or mobile device traffic 320 without experiencing a lowered bit rate.

In another implementation, the subscriber information may indicate a threshold number of tethered devices 180 that may be connected to mobile device 110 at the same time. For example, the subscriber information may indicate that two tethered devices 180 may be connected to mobile device 110 at the same time. The subscriber information may additionally indicate a policy to apply to additional tethered devices 180 attempting to connect to mobile device 110 when the maximum number of tethered devices 180 are currently connected to mobile device 110. For example, the policy may indicate that additional tethered devices 180 will be denied service and packets originating from the additional tethered devices 180 will be dropped. Additionally, subscribers may purchase a different subscription plan to allow more or fewer tethered devices 180 to be connected to mobile device 110 at the same time.

In another implementation, the subscriber information may indicate a priority for dropping connections associated with tethered devices 180 when a maximum number of tethered devices 180 are connected to mobile device 110. For example, when a maximum number of tethered devices 180 are connected to mobile device 110, mobile device 110 may drop a connection with a lower priority tethered device 180 when a higher priority tethered device 110 is attempting to connect to mobile device 110.

In addition, the policy may indicate that only the threshold number of tethered devices 180 may be connected to mobile device 110 when mobile device 110 is connected to packet network 150 via a network other than network 130, such as, for example, a Wireless Fidelity (WiFi) access point that provides short-range wireless access for devices. For example, mobile device 110 and/or billing system 350 or policy server 140 may store subscriber information that indicates the maximum number of tethered devices 180 that may be connected to mobile device 110 at one time. Based on the stored subscriber information, mobile device 110 may deny service or connection to any additional tethered devices 180 attempting to connect to mobile device 110 when the maximum number of tethered devices 180 are currently connected to mobile device 110 when mobile device 110 is accessing content server 160 via a WiFi access point.

A number of communication paths are illustrated in FIG. 3. Additional, different, or fewer communication paths may, in some implementations, be used.

Figure 4A:
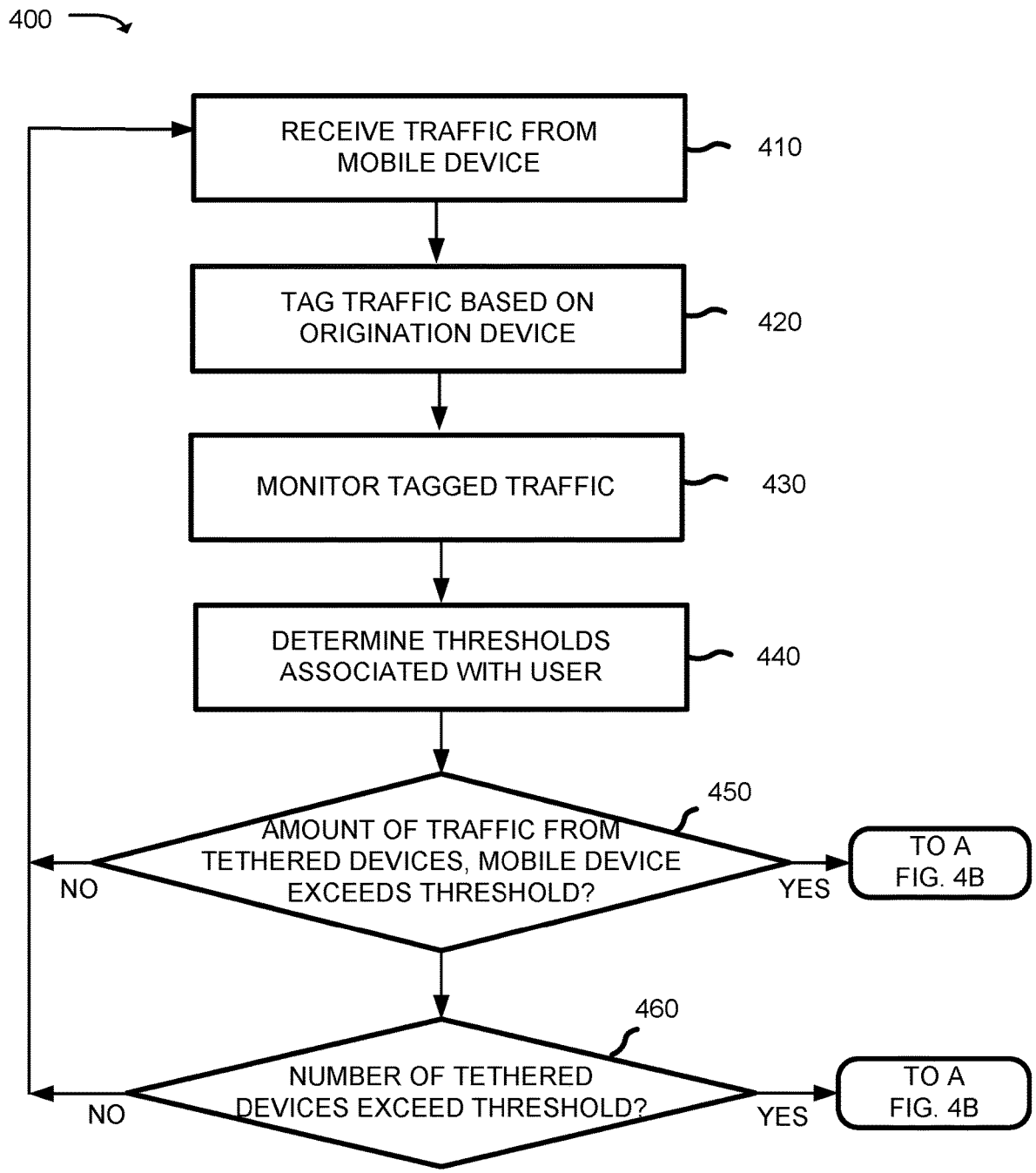
FIG. 4a is a flow chart of an exemplary process for tagging and metering traffic according to an implementation described herein.

FIG. 4A is a flow chart of an exemplary process 400 for tagging and metering tethered traffic according to an implementation described herein. Process 400 may allow for throttling tethered traffic 310 or denying service to a tethered device 180 based on the tagging and metering.

Process 400 may include receiving traffic associated with mobile device 110 (block 410). The receiving may be performed at one or more devices, such as gateway 170. The received traffic may originate from mobile device 110 or from tethered devices 180.

Process 400 may include tagging the traffic based on the originating device (block 410). For example, one or more devices, such as gateway 170, may initiate a packet inspection that reviews patterns of the traffic. In one implementation, gateway 170 may determine an initiating station's identifier (e.g., an IP address, an International Mobile Equipment Identifier (IMEI), a mobile equipment identifier (MEI), etc.) and other characteristics associated with the traffic to determine the originating device. Alternatively, gateway 170 may use any other known technique to determine the originating device. Gateway 170 may then tag the traffic to indicate whether the traffic originated from mobile device 110 or from a tethered device 180 (block 420).

In one implementation, the traffic may be tagged differently based on the time of the day. For example, during certain times of the day, traffic originating from tethered device 180 may not be tagged as originating from tethered device 180. As an example, during off peak hours, a user may be allowed unlimited traffic originating from tethered device 180. In this way, a user may be able to use unlimited amounts of data from tethered devices 180 at certain times of the day without affecting the QoS of other users of the network. The use of unlimited tethered traffic at certain times of the day may be based on a subscription plan selected by a subscriber.

In another implementation, the traffic may be tagged based on what type of tethered device 180 is tethered to mobile device 110. For example, the traffic originating from tethered device 180 may be tagged based on whether tethered device 180 is a laptop, a mobile phone, a television, an IoT device, or another device.

Additionally, the traffic may be tagged based on a number of tethered devices 180 that are connected to mobile device 110. For example, if only one tethered device 180 is connected to mobile device 110 and is being used by a user, the traffic associated with mobile device 110 may be tagged as originating either from mobile device 110 or from tethered device 180. However, if several tethered devices 180 are connected to mobile device 110 and are being used by a user, each traffic flow originating from a tethered device 180 may be tagged differently. For example, if traffic is originating from tethered device 180-1 and tethered device 180-2, the traffic originating from tethered device 180-1 may be numbered or identified differently than traffic originating from tethered device 180-2 to distinguish the traffic from each particular tethered device 180. In this way, the number of tethered devices 180 connected to mobile device 110 may be monitored. In addition, a user's data usage patterns may be monitored in order to offer different subscription plans to the user.

One or more devices, such as gateway 170, may monitor the tagged traffic to determine the amount of traffic that originates from mobile device 110 and the amount of traffic that originates from tethered device(s) 180 (block 430). For example, gateway 170 may count the number of bytes of traffic that is tagged as originating from mobile device 110 and the number of bytes of traffic that is tagged as originating from tethered device(s) 180. Gateway 170 may report the number of bytes of each type of traffic to one or more other devices, such as policy server 140 or billing system 350.

In one implementation, gateway 170 may monitor a number of tethered devices 180 connected to mobile device 110 that are being used by a user. For example, gateway 170 may monitor the tagged traffic and determine that traffic is originating from tethered device 180-1 and tethered device 180-2. Gateway 170 may further monitor a number of bytes of traffic originating from each of tethered device 180-1 and 180-2.

In another implementation, gateway 170 may not monitor traffic originating from tethered devices 180 at certain times of the day. For example, gateway 170 may not count the number of bytes of traffic originating from tethered devices 180 during off peak hours in which volume and/or congestion are not an issue.

One or more devices, such as policy server 140, may determine thresholds associated with the user (block 440). For example, policy server 140 may access billing system 350 and determine subscriber information associated with the user. The subscriber information may indicate a subscription plan associated with the user. The subscription plan may include a first threshold associated with traffic originating from mobile device 110 and a second threshold associated with traffic originating from tethered device 180. In one implementation, the first threshold associated with traffic originating from mobile device 110 may be greater than the second threshold associated with traffic originating from tethered devices 180. For example, the subscription plan may indicate that the subscriber has subscribed to a subscription plan that allows 5 GB of tethered traffic 310 and 20 GB of mobile device traffic 320 in a given billing cycle (e.g., one month). In addition, the subscription plan may indicate a threshold number of tethered devices 180 that may be connected to mobile device 110 at one time. For example, the subscription plan may indicate that two tethered devices 180 may be connected to mobile device 110 at one time. It should be understood that other data volumes and/or number of tethered devices 180 may be used in other instances.

Process 400 may further include determining whether the amount of received traffic exceeds a threshold (block 450). For example, policy server 140 may receive an indication of the number of bytes of traffic that originated from mobile device 110 and the number of bytes of traffic that originated from tethered devices 180. Based on the subscriber information, policy server 140 may determine whether the amount of traffic that originated from mobile device 110 or the amount of traffic that originated from tethered devices 180 exceeds one or more thresholds associated with the user.

For example, if the subscriber information indicates that the subscription plan associated with the user allows 5 GB of traffic originating from tethered devices and 20 GB of traffic originating from mobile device 110 and policy server 140 receives an indication that 5.1 GB of traffic originating from tethered devices 180 and 15 GB of traffic originating from mobile device 110 has been consumed in the current billing cycle, policy server 140 may determine that the threshold associated with traffic originating from tethered devices 180 has been exceeded (block 450—yes). Policy server 140 may further determine that the threshold associated with traffic originating from mobile device 110 has not been exceeded.

Process 400 may further include determining whether a number of tethered devices connected to mobile device 110 has exceeded a threshold (block 460). For example, policy server 140 may receive an indication from gateway 170 that tethered devices 180-1 and 180-2 are connected to mobile device 110 and that tethered device 180-3 is attempting to connect to mobile device 110. Policy server 140 may access billing system 350 and determine that the subscriber information indicates that two tethered devices 180 may be connected to mobile device 110 at one time. Policy server 140 may determine that the number of tethered devices 180 connected to mobile device 110 has exceeded a threshold associated with the subscriber (block 460—yes). In scenarios in which the amount of mobile traffic and tethered traffic does not exceed the respective thresholds, and the number of tethered devices 180 has not exceeded the threshold, processing returns to block 410 to continue monitoring traffic.

Figure 4B:
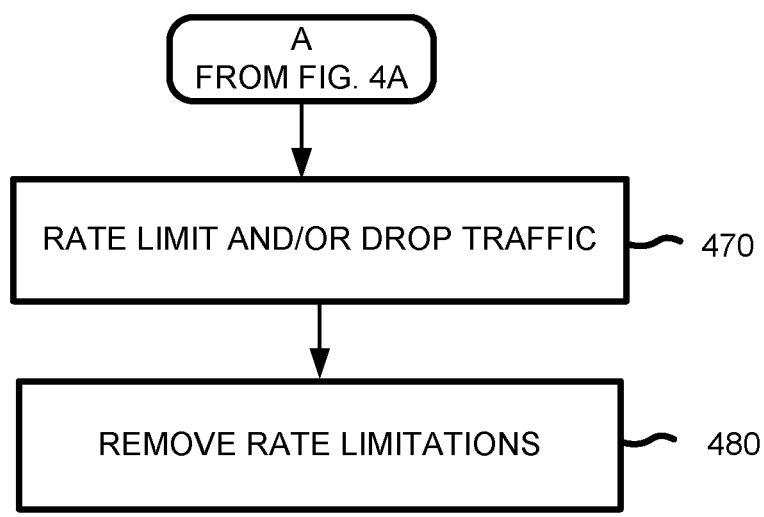
FIG. 4b is a flow chart of an exemplary process for tagging and metering traffic according to an implementation described herein.

As further shown in FIG. 4B, traffic may be rate limited based on the amount of traffic exceeding a threshold and/or traffic may be dropped based on the number of tethered devices 180 connected to mobile device 110 exceeding a threshold (block 470). For example, when the amount of traffic originating from tethered devices 180 has exceeded a threshold associated with the user, policy server 140 may instruct gateway 170 to throttle traffic associated with traffic originating from tethered devices 180 (block 450—yes). Policy server 140 may further instruct gateway 170 to throttle traffic originating from mobile device 110 when the amount of traffic originating from mobile device 110 has exceeded a threshold associated with the user (block 450—yes).

For example, as described above, when the subscriber information indicates thresholds of 5 GB for tethered traffic and 20 GB for mobile device traffic and policy server 140 receives an indication that 5.1 GB of traffic originating from tethered devices 180 and 15 GB of traffic originating from mobile device 110 have been used in the current billing cycle, policy server 140 may instruct gateway 170 to throttle the traffic originating from tethered devices 180. In this case, policy server 140 may instruct gateway 170 to rate limit traffic originating from tethered devices 180 while not rate limiting traffic originating from mobile device 110. In this way, the user may continue to experience a high QoS for traffic originating from mobile device 110 and may experience a reasonable, but lesser QoS for traffic originating from tethered device 180.

In another implementation, policy server 140 may determine that the number of tethered devices 180 connected to mobile device 110 has exceeded a threshold (block 460—yes). In this case, policy server 140 may instruct gateway 170 to drop packets associated with additional tethered devices 180 that attempt to connect to mobile device 110 when the threshold number of allowed tethered devices 180 are connected to mobile device 110. In addition, gateway 170 may instruct mobile device 110 to terminate the connection from the additional tethered device(s) 180 and further block connections that may be attempted by any additional tethered device(s) 180.

For example, when tethered devices 180-1 and 180-2 are connected to mobile device 110 and tethered device 180-3 attempts to connect to mobile device 110, policy server 140 may access billing system 350 and determine that the threshold associated with the subscriber information is two tethered devices 180 and may instruct gateway 170 to deny service to tethered device 180-3. In addition, if tethered device 180-1 disconnects from mobile device 110 and tethered device 180-3 attempts to connect to mobile device 110, policy server 140 may determine that only one tethered device 180 is connected to mobile device 110 and may allow tethered device 180-3 to connect to mobile device 110.

As further shown in FIG. 4B, the rate limitations may be removed (block 480). For example, after a period of time, the original bit rate and QoS may be restored to the traffic originating from mobile device 110 and/or the traffic originating from tethered devices 180. In addition, after the period of time has elapsed, the byte count for the traffic may be reset to zero. The period of time may be based on, for example, a billing cycle, a day, a week, a month, etc. In addition, the period of time may be based on the user associated with mobile device 110 purchasing additional bytes of traffic. For example, if a user has exceeded the threshold for traffic for the period of time and is experiencing a loss in QoS, the user may optionally purchase additional bytes to restore the bit rate to the original bit rate allowed for the user's subscription plan. Additionally, the user may opt to purchase a different subscription plan with higher thresholds in order to restore the original bit rate or experience a higher bit rate.

Systems and/or a methods described herein may monitor and throttle traffic originating from tethered devices to manage network traffic. Monitoring and throttling the traffic can be provided by tagging traffic that originates from the tethered devices and rate limiting the traffic when an amount of the traffic exceeds a threshold associated with a user. In addition, tethered devices may be denied access to a network when a number of tethered devices connected to a mobile device exceeds another threshold associated with the user.

The foregoing description provides illustration and description, but is not intended to be exhaustive or to limit the implementations to the precise form disclosed. Modifications and variations are possible in light of the above disclosure or may be acquired from practice of the implementations.

While a series of blocks has been described with regard to FIGS. 4A and 4B, the order of the blocks may be modified in other implementations. Further, non-dependent blocks may be performed in parallel.

To the extent the aforementioned embodiments collect, store or employ personal information provided by individuals, it should be understood that such information shall be used in accordance with all applicable laws concerning protection of personal information. Additionally, the collection, storage and use of such information may be subject to consent of the individual to such activity, for example, through well known "opt-in" or "opt-out" processes as may be appropriate for the situation and type of information. Storage and use of personal information may be in an appropriately secure manner reflective of the type of information, for example, through various encryption and anonymization techniques for particularly sensitive information.

It will be apparent that systems and/or methods, as described above, may be implemented in many different forms of software, firmware, and hardware in the implementations illustrated in the figures. The actual software code or specialized control hardware used to implement these systems and methods is not limiting of the embodiments. Thus, the operation and behavior of the systems and methods were described without reference to the specific software code—it being understood that software and control hardware can be designed to implement the systems and methods based on the description herein.

Further, certain portions, described above, may be implemented as a component that performs one or more functions. A component, as used herein, may include hardware, such as a processor, an ASIC, or a FPGA, or a combination of hardware and software (e.g., a processor and executing software).

It should be emphasized that the terms "comprises"/ "comprising" when used in this specification are taken to specify the presence of stated features, integers, steps or components but does not preclude the presence or addition of one or more other features, integers, steps, components or groups thereof.

Even though particular combinations of features are recited in the claims and/or disclosed in the specification, these combinations are not intended to limit the disclosure of the embodiments. In addition, although each dependent claim listed below may directly depend on only one other claim, the disclosure of the embodiments includes each dependent claim in combination with every other claim in the claim set.

No element, act, or instruction used in the present application should be construed as critical or essential to the embodiments unless explicitly described as such. Also, as used herein, the article "a" is intended to include one or more items. Where only one item is intended, the term "one" or similar language is used. Further, the phrase "based on" is intended to mean "based, at least in part, on" unless explicitly stated otherwise.

In the preceding specification, various preferred embodiments have been described with reference to the accompanying drawings. It will, however, be evident that various modification and changes may be made thereto, and additional embodiments may be implemented, without departing from the broader scope of the invention as set forth in the claims that follow. The specification and drawings are accordingly to be regarded in an illustrative rather than restrictive sense.

What is claimed is:

1. A method comprising:
   receiving first traffic and second traffic associated with a mobile device,
      wherein the first traffic originates from the mobile device, and
      wherein the second traffic originates from one or more second devices that are tethered to the mobile device;
   tagging the second traffic to indicate that the second traffic originates from the one or more second devices;
   identifying, from subscriber data associated with a user of the mobile device, a first threshold and a second threshold,
      wherein the first threshold is associated with the first traffic originating from the mobile device, and
      wherein the second threshold is associated with the second traffic originating from the one or more second devices;
   determining that an amount of the second traffic exceeds the second threshold; and
   rate limiting the second traffic without rate limiting the first traffic in response to determining that the amount of the second traffic exceeds the second threshold and an amount of the first traffic does not exceed the first threshold.

2. The method of claim 1, further comprising:
  determining that the amount of the first traffic exceeds the first threshold; and
  rate limiting the first traffic in response to determining that the amount of the first traffic exceeds the first threshold.

3. The method of claim 1, wherein the subscriber data includes a subscription plan associated with the user of the mobile device.

4. The method of claim 1, further comprising:
  removing the rate limiting in response to the user purchasing an additional amount of the second traffic.

5. The method of claim 1, wherein the subscriber data includes a third threshold, and wherein the third threshold indicates a number of the one or more second devices that can be tethered to the mobile device simultaneously.

6. The method of claim 5, further comprising:
  determining that the number of the one or more second devices is greater than the third threshold; and
  terminating a connection with at least one of the one or more second devices when the number of the one or more second devices is greater than the third threshold.

7. The method of claim 1, wherein tagging the second traffic includes tagging the second traffic during a first time of the day and not tagging the second traffic during a second time of the day.

8. A system comprising:
  one or more processors configured to:
    receive first traffic and second traffic associated with a mobile device,
      wherein the first traffic originates from the mobile device, and
      wherein the second traffic originates from one or more second devices that are tethered to the mobile device;
    tag the second traffic to indicate that the second traffic originates from the one or more second devices;
    identify, from subscriber data associated with a user of the mobile device, a first threshold and a second threshold,
      wherein the first threshold is associated with the first traffic originating from the mobile device, and
      wherein the second threshold is associated with the second traffic originating from the one or more second devices;
    determine that an amount of the second traffic exceeds the second threshold; and
    rate limit the second traffic without rate limiting the first traffic in response to determining that the amount of the second traffic exceeds the second threshold and an amount of the first traffic does not exceed the first threshold.

9. The system of claim 8, wherein the one or more processors are further configured to:
  determine that the amount of the first traffic exceeds the first threshold; and
  rate limit the first traffic in response to determining that the amount of the first traffic exceeds the first threshold.

10. The system of claim 8, wherein the subscriber data includes a subscription plan associated with the user of the mobile device.

11. The system of claim 8, wherein the one or more processors are further configured to:
  remove the rate limiting in response to the user purchasing an additional amount of the second traffic.

12. The system of claim 8, wherein the subscriber data includes a third threshold, and wherein the third threshold indicates a number of the one or more second devices that can be tethered to the mobile device simultaneously.

13. The system of claim 12, wherein the one or more processors are further configured to:
  determine that the number of the one or more second devices is greater than the third threshold; and
  terminate a connection associated with at least one of the one or more second devices when the number of the one or more tethered devices is greater than the third threshold.

14. The system of claim 8, wherein, when tagging the second traffic, the one or more processors are further configured to tag the second traffic during a first time of the day and not tag the second traffic during a second time of the day.

15. A non-transitory computer-readable medium storing instructions, the instructions comprising:
  one or more instructions that, when executed by a processor, cause the processor to:
    receive first traffic and second traffic associated with a mobile device,
      wherein the first traffic originates from the mobile device, and
      wherein the second traffic originates from one or more second devices that are tethered to the mobile device;
    tag the second traffic to indicate that the second traffic originates from the one or more second devices;
    identify, from subscriber data associated with a user of the mobile device, a first threshold and a second threshold,
      wherein the first threshold is associated with the traffic originating from the mobile device, and
      wherein the second threshold is associated with the traffic originating from the one or more second devices;
    determine that an amount of the second traffic exceeds the second threshold; and
    rate limit the second traffic without rate limiting the first traffic in response to determining that the amount of the second traffic exceeds the second threshold and an amount of the first traffic does not exceed the first threshold.

16. The non-transitory computer-readable medium of claim 15, wherein the instructions further comprise:
  one or more instructions that cause the processor to:
    determine that the amount of the first traffic exceeds the first threshold; and
    rate limit the first traffic in response to determining that the amount of the first traffic exceeds the first threshold.

17. The non-transitory computer-readable medium of claim 15, wherein the subscriber data includes a subscription plan associated with the user of the mobile device.

18. The non-transitory computer-readable medium of claim 15, wherein the instructions further comprise:
  one or more instructions that cause the processor to:
    remove the rate limiting in response to the user purchasing an additional amount of the second traffic.

19. The non-transitory computer-readable medium of claim 15, wherein the subscriber data includes a third threshold, wherein the third threshold indicates a number of the one or more second devices that can be tethered to the mobile device simultaneously, and wherein the instructions further comprise:
  one or more instructions that cause the processor to:
    determine that the number of the one or more second devices is greater than the third threshold; and terminate a connection associated with at least one of the one or more second devices when the number of the one or more second devices is greater than the third threshold.

20. The non-transitory computer-readable medium of claim 15, wherein the one or more instructions that cause the processor to tag the second traffic further comprise one or more instructions that cause the processor to tag the second traffic during a first time of the day and not tag the second traffic during a second time of the day.

* * * * *